(12) United States Patent
Eum

(10) Patent No.: US 11,064,265 B2
(45) Date of Patent: Jul. 13, 2021

(54) METHOD OF PROCESSING MEDIA CONTENTS

(71) Applicant: TMAX A&C CO., LTD., Gyeonggi-do (KR)

(72) Inventor: Jaiho Eum, Incheon (KR)

(73) Assignee: Tmax A&C Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/597,430

(22) Filed: Oct. 9, 2019

(65) Prior Publication Data

US 2020/0389710 A1 Dec. 10, 2020

(30) Foreign Application Priority Data

Jun. 4, 2019 (KR) .................. 10-2019-0065712

(51) Int. Cl.
*H04N 21/81* (2011.01)
*H04L 29/06* (2006.01)
(Continued)

(52) U.S. Cl.
CPC ..... *H04N 21/8126* (2013.01); *G06F 16/9577* (2019.01); *G06Q 10/10* (2013.01);
(Continued)

(58) Field of Classification Search
CPC ............ H04L 29/08081–0809; H04L 29/06476–06503; H04L 29/08108;
(Continued)

(56) References Cited

U.S. PATENT DOCUMENTS 6,587,118 B1 * 7/2003 Yoneda ................ G06F 3/0481
345/629
6,826,696 B1 * 11/2004 Chawla ............... H04L 63/0815
713/168
(Continued)

FOREIGN PATENT DOCUMENTS

JP  2006302231 A  11/2006
JP  2019008566 A   1/2019
(Continued)

OTHER PUBLICATIONS

Korea Intellectual Property Office, Office Action, dated May 26, 2020; 8 pgs.

*Primary Examiner* — Brendan Y Higa
(74) *Attorney, Agent, or Firm* — Umberg Zipser LLP

(57) ABSTRACT

Disclosed is a method for processing media contents. A method for processing media content in a client terminal includes: receiving first information related to a partial media content and a background media content from a managing server, in which the first information includes region information of the partial media content and second information to create the partial media content; creating the partial media content based on the second information; creating an entire media content based on the region information, the partial media content and the background media content; and displaying the entire media content, in which the partial media content includes one of a partial media content object and a function object.

19 Claims, 9 Drawing Sheets

(51) Int. Cl.
  *H04N 21/235* (2011.01)
  *H04L 29/08* (2006.01)
  *G06F 16/957* (2019.01)
  *G06Q 10/10* (2012.01)
(52) U.S. Cl.
  CPC ........ *H04L 29/0809* (2013.01); *H04L 65/602* (2013.01); *H04L 67/02* (2013.01); *H04L 67/42* (2013.01); *H04N 21/2355* (2013.01); *H04N 21/812* (2013.01)
(58) Field of Classification Search
  CPC ........... H04L 29/08117; H04L 41/0253; H04L 65/60–605; H04L 67/02; H04L 67/04; H04L 67/06; H04L 67/42; G06F 16/957–986; H04N 21/2355; H04N 21/4355; G06Q 10/10–109
  See application file for complete search history.

(56) References Cited

U.S. PATENT DOCUMENTS

| | | | |
|---|---|---|---|
| 7,646,932 B1 * | 1/2010 | Peterson | H04N 5/23238 382/284 |
| 2002/0095456 A1 * | 7/2002 | Wensheng | H04L 67/306 709/203 |
| 2003/0200507 A1 * | 10/2003 | Stern | G06F 16/972 715/249 |
| 2004/0078312 A1 * | 4/2004 | Bush | G06Q 40/00 705/35 |
| 2010/0077294 A1 * | 3/2010 | Watson | G06F 16/9577 715/234 |
| 2010/0162411 A1 | 6/2010 | Chang et al. | |
| 2013/0111330 A1 * | 5/2013 | Staikos | G06F 40/10 715/241 |
| 2014/0208197 A1 * | 7/2014 | Ellis | G06F 3/0481 715/234 |
| 2016/0004391 A1 * | 1/2016 | Cotlarciuc | G06F 3/048 715/760 |
| 2016/0198097 A1 * | 7/2016 | Yewdall | H04N 5/272 348/659 |

FOREIGN PATENT DOCUMENTS

| | | |
|---|---|---|
| KR | 1020070109103 A | 11/2007 |
| KR | 1020100066334 A | 6/2010 |
| KR | 101344450 B1 | 12/2013 |

* cited by examiner

METHOD OF PROCESSING MEDIA CONTENTS

CROSS-REFERENCE TO RELATED APPLICATIONS

This application claims priority to and the benefit of Korean Patent Application No. 10-2019-0065712 filed in the Korean Intellectual Property Office on Jun. 4, 2019, the entire contents of which are incorporated herein by reference.

TECHNICAL FIELD

The present disclosure relates to a method for processing media contents, and more particularly, to a method for processing a plurality of media contents.

BACKGROUND ART

Recently, a data transmission load of a server in a cloud computing environment has increased exponentially. When a client terminal performs media contents related work in the cloud computing environment, if the server processes all data related to the media contents related work and transmits the processed data to the client terminal, the data transmission load of the server becomes high and the performance of the entire media content system may be thus reduced. Accordingly, there is a need in the art for technology that can reduce the data transmission load of the server in the cloud computing environment.

SUMMARY OF THE INVENTION

The present disclosure has been made in an effort to provide a method for processing a plurality of media contents.

However, technical objects of the present disclosure are not restricted to the technical object mentioned as above. Unmentioned technical objects will be apparently appreciated by those skilled in the art by referencing to the following description.

An exemplary embodiment of the present disclosure provides a method for processing media contents in a client terminal. The method may include: receiving first information related to a partial media content and a background media content from a managing server, in which the first information includes region information of the partial media content and second information to create the partial media content; creating the partial media content based on the second information; creating an entire media content based on the region information, the partial media content and the background media content; and displaying the entire media content, in which the partial media content may include one of a partial media content object and a function object.

The creating of the partial media content based on the second information may include sending a transmission request signal for the partial media content object to a content server based on the second information; and receiving the partial media content object from the content server, in which the second information may include at least one of address information which enables an access to the partial media content object or information which is related to a stored location of the partial media content object in the content server.

The creating an entire media content based on the region information, the partial media content and the background media content may include creating the entire media content by composing or combining the partial media content and background media content in a web browser based on the region information.

The creating of the entire media content by composing or combining the partial media content and background media content based on the region information may include: deciding an area for the partial media content to be inserted based on the region information; inserting the partial media content object or the function object to the area for the partial media content to be inserted; and creating the entire media content by overlapping the partial media content and the background media content.

The method may further include: creating the region information based on an inserting command to insert the partial media content object; and transmitting the partial media content object and the region information to a managing server.

The creating of the partial media content based on the second information may include: creating the function object corresponding to function decision information included in the second information.

The creating of the function object may be conducted using web-based language.

The method may further include: creating the region information based on a generation command to create the function object; and transmitting the region information to the managing server.

Another exemplary embodiment of the present disclosure provides a method for a managing server connected to a client terminal to process a media content. The method for a managing server connected to a client terminal to process a media content may include: receiving an input information related to a user command from the client terminal; recognizing whether a partial media content is required to be displayed on a background media content in the client terminal based on the input information; and transmitting first information required to create the partial media content and the background media content to the client terminal, when the partial media content is required to be displayed on the client terminal, in which the first information may include the region information of the partial media content and the second information to create the partial media content and the partial media content may include one of partial media content object and function object.

The recognizing of whether a partial media content is required to be displayed on a background media content in the client terminal based on the input information may include: recognizing whether an area in which the partial media content is inserted into is included in an area in which the background media content is displayed in the client terminal based on the input information; and deciding the partial media content is required to be displayed on the background media content when the area in which the partial media content is inserted is included in the area in which the background media content is displayed.

The recognizing of whether the area in which the partial media content is inserted is included in the area in which the background media content is displayed in the client terminal based on the input information may include: determining pixels corresponding to the background media content to be displayed using the input information; recognizing pixels corresponding to the partial media content to be inserted; and deciding whether at least one pixel of the pixels corresponding to the partial media content to be inserted is included in the pixels corresponding to the background media content to be displayed.

The method for processing media contents may further include: receiving the partial media content object and the region information from the client terminal; and transmitting the partial media content object to the content server.

The transmitting of the partial media content object to the content server may include: zipping the partial media content object based on the region information. Further, the zipping of the partial media content object based on the region information may include: creating a size information of the partial media content object based on the region information; and resizing the partial media content object based on the size information.

The recognizing of whether a partial media content is required to be displayed on a background media content in the client terminal based on the input information may include: deciding whether function object creation is requested based on the input information.

One or more predetermined web office functions may be assigned to the function object and the function object may be able to have an interaction responding to the user input.

Yet another exemplary embodiment of the present disclosure provides a non-transitory computer readable medium storing a computer program to execute the method according to any one of claims 1 to 16 in a computing device.

Still yet another exemplary embodiment of the present disclosure provides a client terminal to process a media content. The client terminal may include: a processor; a storage unit; a communication unit; and a display unit; in which the processor may be configured to: receive first information related to a partial media content and a background media content from a managing server via the communication unit, in which the first information may include a region information of the partial media content and second information to create the partial media content, create the partial media content based on a second information, create an entire media content based on the region information, the partial media content and the background media content, control the display unit to display the entire media content, in which the partial media content may include one of a partial media content object or a function object.

Still yet another exemplary embodiment of the present disclosure provides a managing server to process a media content. The managing server may include: a processor; a storage unit; and a communication unit; in which the processor may be configured to: receive input information related to a user command from a client terminal, recognize whether a partial media content is required to be displayed on a background media content in the client terminal based on the input information, control the communication unit to transmit to the client terminal the first information required to create the partial media content and the background media content when the partial media content is required to be displayed on the client terminal, in which the first information may include a region information of the partial media content and the second information to create the partial media content, in which the partial media content may include one of a partial media content object and a function object.

Technical solving means which can be obtained in the present disclosure are not limited to the aforementioned solving means and other unmentioned solving means will be clearly understood by those skilled in the art from the following description.

According to an exemplary embodiment of the present disclosure, provided is a method for processing a plurality of media contents.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

One or more components may reside within a processor and/or an execution thread. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Those skilled in the art need to recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Figure 1:
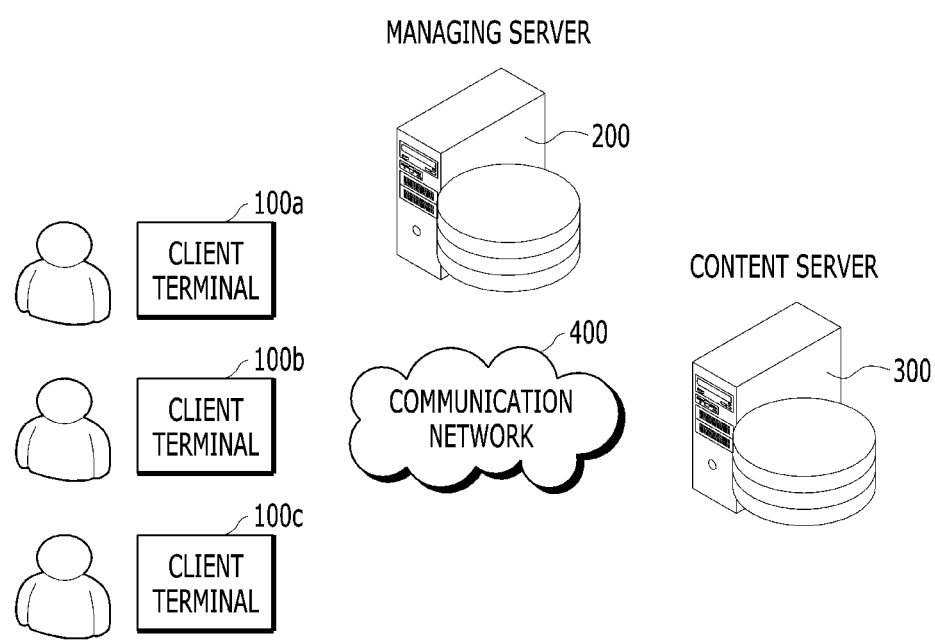
FIG. 1 is a diagram illustrating an example of a system of processing media contents according to some exemplary embodiments of the present disclosure.

FIG. 1 is a diagram illustrating an example of a system of processing media contents according to some exemplary embodiments of the present disclosure.

Processing media contents according to some exemplary embodiments of the present disclosure may be related to creation and display of entire media contents based on background media contents (e.g., a screen representing a document of an office program) and partial media contents (e.g., a function object created using an inserted image, video, or web based language) in a web office of an image transmission method. However, the processing of the media contents is not limited to an exemplary embodiment related to the web office of the image transmission method described above and may include various examples depending on an application to which the media content processing is applied.

As illustrated in FIG. 1, a system for processing media contents may include client terminals 100a, 100b, and 100c: 100, a managing server 200, a content server 300, and a communication network 400. Components illustrated in FIG. 1 are exemplary and additional components may exist or some of the components illustrated in FIG. 1 may be omitted.

Although not illustrated in FIG. 1, the client terminal 100, the managing server 200, and the content server 300 may include a memory, a communication unit, and a processor.

The client terminal 100 has a mechanism for communicating with the managing server 200 or the content server 300 via a communication network 400, and may refer to any type of node in the system for processing media contents.

For example, the client terminal 100 may include a personal computer (PC), a laptop computer, a workstation, a terminal, and/or a predetermined electronic device having network connectivity. Further, the client terminal 100 may include a predetermined server implemented by at least one of an agent, an application programming interface (API), and plug-in. In addition, the client terminal 100 may include an application source and/or a client application.

The client terminal 100 may be a predetermined entity which includes a processor and a storage unit (a memory and a persistent storage medium) to process and store predetermined data.

The client terminal 100 is connected to the managing server 200 to transmit information required for processing the media contents to the managing server 200 and the content server 300 in the process of processing the media contents.

The managing server 200 and a content server according to some exemplary embodiments of the present disclosure may include a predetermined type computer system or computer device such as a microprocessor, a mainframe computer, or a digital processor. Although not illustrated in FIG. 1, the managing server 200 may include a memory, a communication unit, and a processor.

The communication network 400 according to some exemplary embodiments of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The communication network 400 presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. The techniques described in the present disclosure may also be used in any type of other communication networks in addition to the aforementioned networks.

Figure 2:
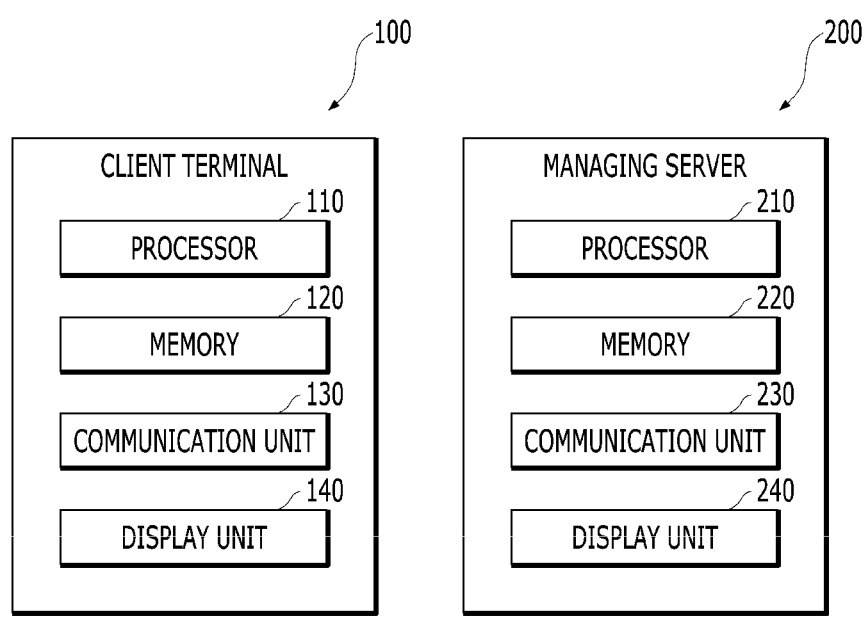
FIG. 2 is a diagram illustrating an example of configurations of a client terminal and a managing server according to some exemplary embodiments of the present disclosure.

FIG. 2 is a diagram illustrating an example of configurations of a client terminal and a managing server according to some exemplary embodiments of the present disclosure.

As illustrated in FIG. 2, the client terminal 100 and the managing server 200 may include processors 110 and 210, memories 120 and 220, communication units 130 and 230, and display units 140 and 240.

The processors 110 and 210 may be constituted by one or more cores and may include any type of processors for processing the media contents by executing commands stored in the memory, which include a central processing unit (CPU), a general purpose graphics processing unit (GPGPU), a tensor processing unit (TPU), and the like of the computing device. The processor may process the media contents according to some exemplary embodiments of the present disclosure by reading a computer program stored in the memory. The processor may control overall operations of the components of the client terminal 100 and the managing server 200 in order to process the media contents.

The processor 110 of the client terminal 100 may control overall operations of the components of the client terminal 100 in order to process the media contents. Further, the processor 210 of the managing server 200 may control overall operations of the components of the managing server 200 in order to process the media contents.

The client terminal 100 and the managing server 200 may further include the memories 120 and 220. The memory may store a program for operations of the processors 110 and 210 and temporarily or persistently store input/output data. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The memory may be operated by control by the processor. Further, in the present disclosure, the memory and the storage unit may be used interchangeably with each other.

The communication units 130 and 230 may include a wired/wireless Internet module for network connection. The communication units 130 and 230 may perform communication with the managing server 200 and the content server 300. As wireless Internet technology, wireless LAN (WLAN) (Wi-Fi), wireless broadband (Wibro), world Interoperability for microwave access (Wimax), high speed downlink packet access (HSDPA), and the like may be used. As wired Internet technology, a digital subscriber line (XDSL), fibers to the home (FTTH), power line communication (PLC), or the like may be used.

The aforementioned components are exemplary and the scope of the present disclosure is not limited to the aforementioned components. That is, additional components may be included or some of the aforementioned components may be omitted according to implementation aspects of exemplary embodiments of the present disclosure.

The client terminal 100 and the managing server 200 include the display units 140 and 240 to receive an input of a user in a signal and information related to media content processing and provide any type of output to the user.

Hereinafter, a method for processing media contents according to some exemplary embodiments of the present disclosure will be described.

Figure 3:
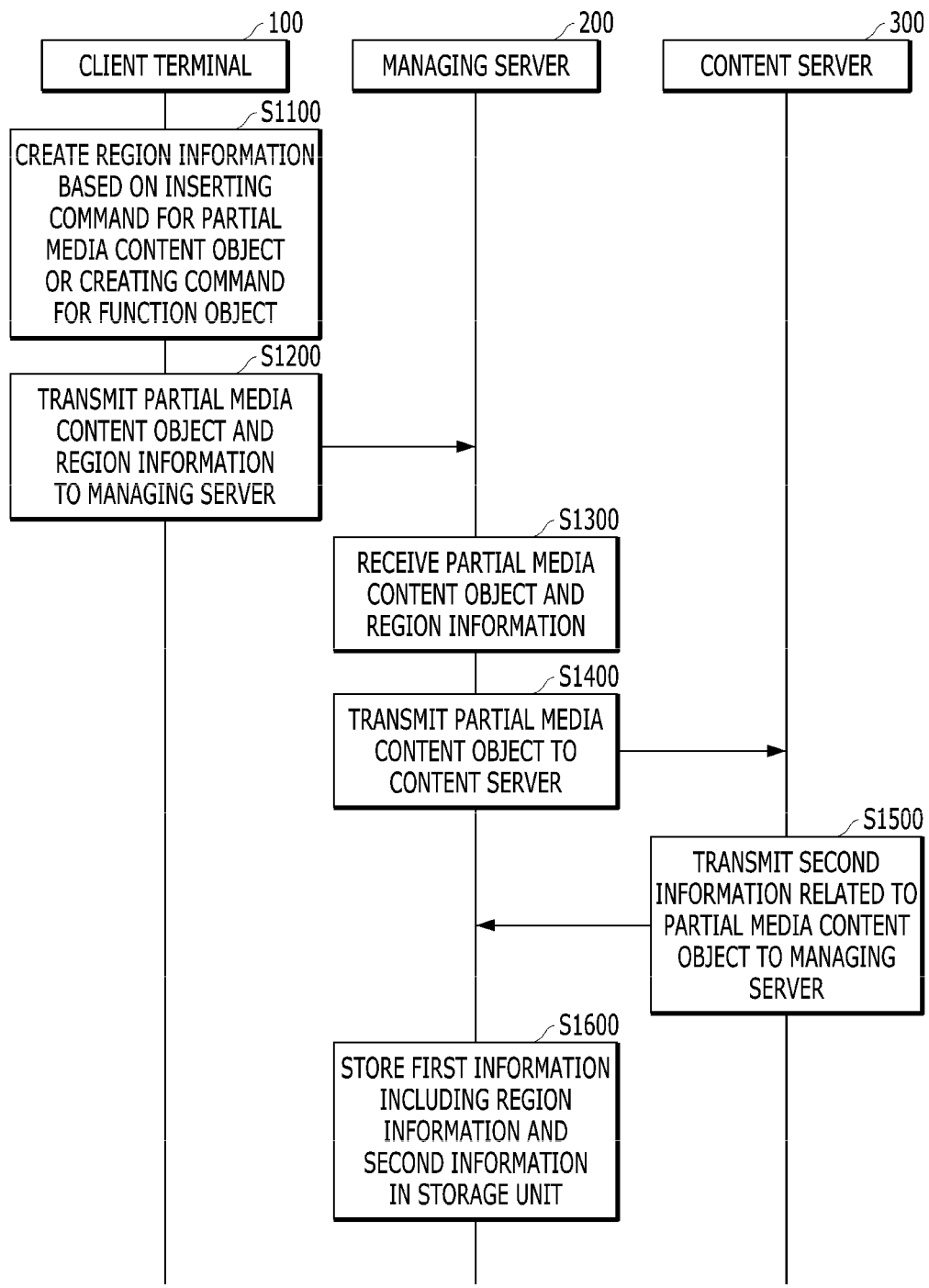
FIG. 3 is a signal flowchart showing an example in which a managing server acquires first information including region information and second information according to some exemplary embodiments of the present disclosure.

FIG. 3 is a signal flowchart showing an example in which a managing server acquires first information including region information and second information according to some exemplary embodiments of the present disclosure.

Referring to FIG. 3, the processor 110 of the client terminal 100 may generate the region information based on an inserting command for the partial media content object or a generating command for a function object (S1100).

In some exemplary embodiments of the present disclosure, the media content object may refer to an object which may be stored and used in a computer readable medium or in a computer as a multimedia work such as digitized language, music, photographs, movies, and/or art. Further, the media content object may refer to an information content object digitized and produced, distributed, and consumed by an information device or an information content object which is transmitted/received bidirectionally through a broadband communication network or a high-speed data network.

Specifically, the media content object may include a medium, a system, and a content in which various types of information such as voice, text, pictures, and a moving picture are mixed.

The function object may refer to an object to which one or more predetermined application functions are allocated and an interaction is possible in response to a user input. The function object may be interactable in response to the user input. As an example, the function object may be generated by using a web based language. In an example related to an office product, the function object may include function keys or function tabs in the office product.

The media content object and the function object are not limited to the above examples and may include various examples according to the type of media contents and an application.

The region information may be defined as information specifying an area in which the partial media contents including the partial media content object or function object is included (or represented) on the background media contents.

As an example, when the partial media contents are the partial media content object, the region information may be a set of pixel coordinates that specify an area into which the partial media content object is inserted. That is, when the partial media content object is a quadrangle image or video, the region information may be a set of pixel coordinates at which vertices of a quadrangle are positioned.

As another example, when the partial media content object is the voice, the region information may include time information at which the corresponding voice is inserted and time information at which the corresponding voice is terminated.

As yet another example, when the partial media content is the function object, the region information may include information indicating a location where the generating command for the function object is made.

The inserting command for the partial media content object may mean instructing to generate the partial media content object in a specific area on background media specified by the region information.

The generating command for the function object may mean instructing to generate the function object at a specific location on the background media specified by the region information.

After the region information is generated in step S1100, the processor 110 may transmit to the managing server 200 the partial media content object and the region information through the communication unit 130 (S1200).

When the partial media contents include only the function object, only the region information excluding the partial media content object may be transmitted to the managing server 200.

When the partial media contents include only the function object, the processor 210 may transmit first information and the background media contents for generating the partial media contents to the client terminal 100 based on the region information and the input of the user. The client terminal 100 may generate the function object based thereon and display the entire media contents based on the generated function object and background media contents. A detailed embodiment of the first information will be described below in FIG. 4.

The processor 210 of the managing server 200 may receive the partial media content object and the region information from the client terminal (S1300).

The processor 210 may receive the partial media content object and the region information in step S1300 and transmit the received partial media content object to the content server 300 (S1400).

In some exemplary embodiments of the present disclosure, the content server 300, as a separate entity from the managing server 200, may serve to store the partial media content object inserted by the client terminal 100 and receives a partial media content object transmission request and transmit the partial media content object to the client terminal.

An example of transmitting the partial media content object to the content server 300 will be described below in detail in FIG. 5.

In some exemplary embodiments of the present disclosure, the processor 210 may zip the partial media content object and transmit the zipped partial media content object to the content server.

Specifically, as an example of zipping of the media content object, media zipping techniques (no-loss zipping or loss zipping, e.g., BMP, PNG, MPEG, WMV, JPEG, etc.) which are well known to those skilled in the art including the present disclosure may be used.

As yet another example, the processor 210 may resize the media contents based on the region information and transmit the resized media contents to the content server 300. Resizing the media contents and transmitting the resized media contents to the content server will be described below in FIG. 9.

A method in which the processor 210 zips the partial media content object is not limited to an example included in the present disclosure.

The content server 300 may store the partial media content object transmitted through step S1400 and transmit second information related to the stored partial media content object to the managing server (S1500).

Specifically, the second information may mean information to access the partial media content object. A specific example of the second information will be described below in detail in FIG. 5.

The processor 210 may receive the second information from the content server through step S1500 and then generate the first information including the region information received from the client terminal 100 and the second information received from the content server 300 and store the generated first information (S1600).

FIG. 3 illustrates an example in which, when the partial media contents are inserted into the background media contents, the managing server stores only information for accessing the partial media contents and information on an area in which the partial media contents are to be expressed. Therefore, when the client terminal intends to express the partial media contents in the cloud environment, the managing server need not directly transmit the partial media contents to the client terminal. Accordingly, a media content transmission load of the managing server may be significantly reduced and a burden on a storage space of the managing server may be reduced.

Figure 4:
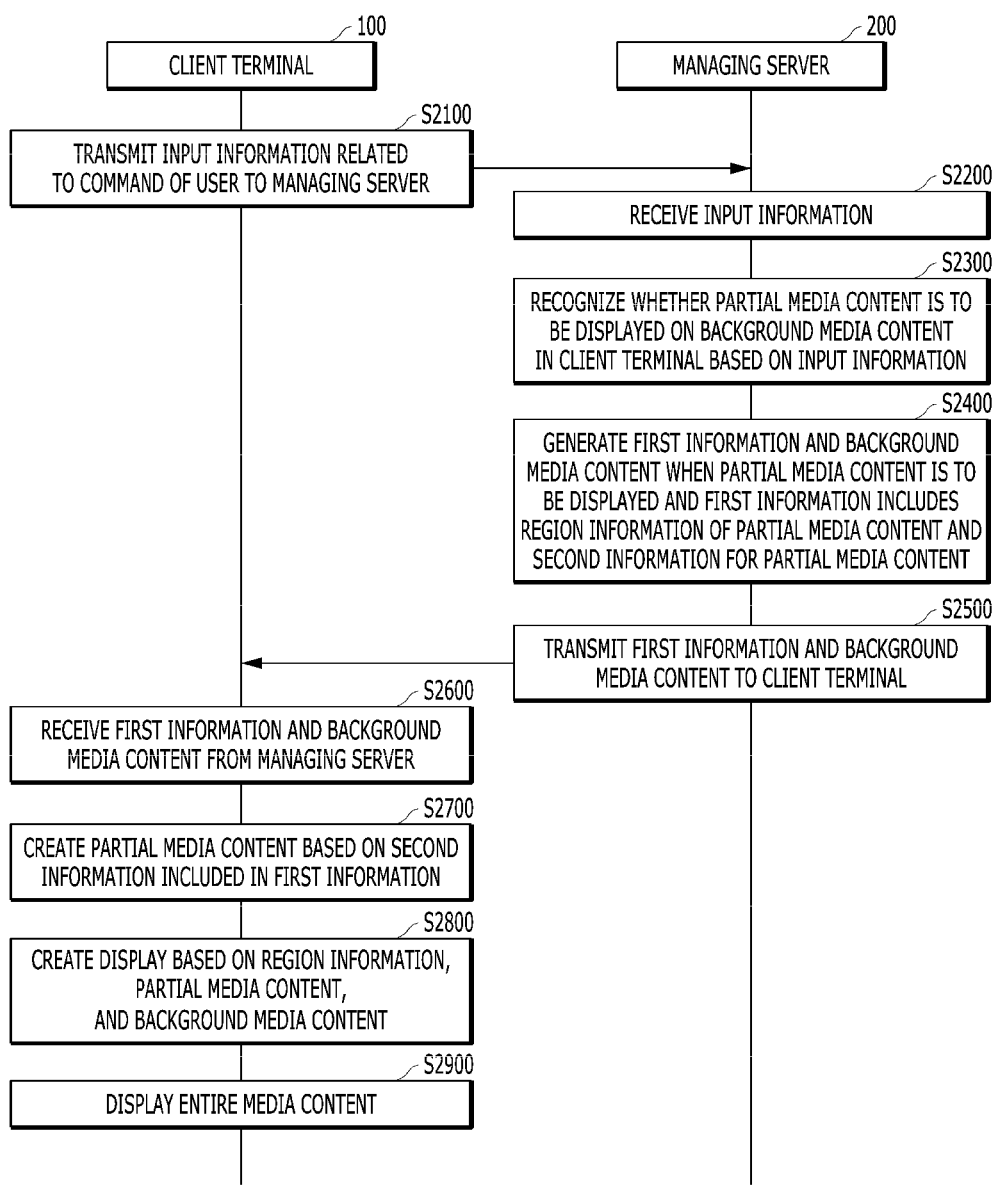
FIG. 4 is a signal flowchart showing an example in which a client terminal displays entire media contents based on partial medial contents and background media contents according to some exemplary embodiments of the present disclosure.

FIG. 4 is a signal flowchart showing an example in which a client terminal displays entire media contents based on partial medial contents and background media contents according to some exemplary embodiments of the present disclosure.

Referring to FIG. 4, the processor 110 of the client terminal 100 may transmit input information related to the command of the user to the managing server 200 through the communication unit 130 (S2100).

Specifically, the input information related to the command of the user may mean information corresponding to a signal input (i.e., a direction key press/left click/right click/wheel up or wheel down) by the user through an input device (e.g., a keyboard or a mouse). Additionally, the input information related to the command of the user may mean information corresponding to a signal input by the user through a touch operation.

The processor 210 of the managing server 200 may receive the input information which the client terminal 100 transmits in step S2100 (S2200).

The processor 210 may recognize whether the partial media contents are to be displayed on the background media contents in the client terminal based on the input information (S2300).

In some exemplary embodiments of the present disclosure, the partial media contents may include one of the partial media content object and the function object, as described above in FIG. 3.

Specifically, the partial media contents may include an image, a video, voice, and the like. Further, the partial media contents according to some exemplary embodiments of the present disclosure may include an object which is interactable in response to the user input as the function object. Here, one or more predetermined functions may be allocated to the function object. One or more predetermined functions may be one or more predetermined web office functions.

In some exemplary embodiments of the present disclosure, the background media contents may refer to separate media contents into which partial media contents are inserted. That is, the partial media contents may be included in the background media contents.

Specifically, the background media contents may include the image, the video, the voice, or multimedia data in which the image, the video, and the video are combined.

As an example, when the background media contents are the image, the background media contents may be obtained by converting a screen of a web office program executed by the managing server 200 into an image of a type readable by the client terminal 100.

Here, recognizing whether the partial media contents are to be displayed may be recognized based on the area where the input information and the background media contents are displayed on the client terminal.

In some exemplary embodiments of the present disclosure, recognizing whether the partial media contents are to be displayed on the background media contents by the client terminal is to determine whether a function object generation request is made based on the input information received from the client terminal.

As described above, the input information may be all types of signals input by the user through the input device. In order for the client terminal 100 to generate the function object, the processor 110 may need to determine whether the received input information is an input of a type for generating the function object.

That is, as an example, when the input information is a signal of clicking a right button of a mouse (i.e., right click) and the right click is included in one of several input types for generating the function object, it may be recognized that the function object generation request is made.

The function object generation request is not limited to the aforementioned example, but may vary depending on the types of the application and the media contents.

An additional exemplary embodiment of recognizing whether the partial media contents are displayed will be described below in detail in FIG. 7.

When the partial media contents are to be displayed, the processor 210 may generate the first information and the background media contents (S2400).

In some exemplary embodiments of the present disclosure, the first information may include the region information of the partial media contents and second information for generating the partial media contents.

The region information may mean information for specifying an area where partial media contents are to be displayed. The region information is described in detail in FIG. 3, so here, a detailed description thereof will be omitted.

The second information for generating the partial media contents may be information required for expressing the partial media contents in the client terminal or function determination information corresponding to the input information of the client terminal.

As an example, when the second information is information required for expressing the partial media contents in the client terminal, the second information may include information on an address accessible to the partial media contents and information on a storage location of the partial media content object in the content server.

As another example, when the second information includes the function determination information, when the partial media contents are the function object, and when the input information is the right click, the second information may be information for instructing the function object to be generated and when the input information is the left click or a shortcut key, the second information may be information for instructing another function object corresponding to a specific web office function to be generated. However, the second information is not limited to some examples described above, but may vary depending on a type of media contents, a function provided by the application, etc.

The processor 210 may transmit the first information and the background media contents to the client terminal 100 through the communication unit 230 (S2500).

By steps S2200 to S2500 described above, the managing server 200 may allow the client terminal 100 to display the partial media contents through the display unit 140 even though the managing server 200 does not directly transmit the partial media contents to the client terminal. Accordingly, a transmission load of the managing server 200 may be reduced in a situation such as a cloud environment in which one managing server 200 communicates with multiple client terminals 100.

The processor 110 of the client terminal 100 may receive the first information and the background media contents from the managing server 200 (S2600).

The processor 110 may generate the partial media contents based on the second information included in the first information received in step S2600 (S2700).

Specifically, the generated partial media contents may be the image, the video, and the voice included in the partial media content object.

As an example, the partial media contents may be a function object corresponding to the function determination information included in the second information and the function object may be generated by using a web based language.

When the function object generation request is made, the processor 210 may transmit the first information and the background media contents for generating the partial media contents to the client terminal 100 based on the region information and the input of the user. The client terminal 100 may generate the function object based thereon and display the entire media contents based on the generated function object and background media contents.

The processor 110 may generate entire media contents based on the partial media contents, the region information, and the background media contents generated in step S2700 (S2800).

Entire media contents according to some exemplary embodiments of the present disclosure may mean media contents displayed through the display unit 140 of the client terminal 100 as media contents in which the partial media contents and the background media contents are combined, or synthesized. Entire media contents may be generated by combining or synthesizing the partial media contents with the background media contents, but a method for encapsulating the partial media contents in the background media contents is not limited to the aforementioned combination or synthesis.

Generating entire media contents based on the region information, the partial media contents, and the background media contents may include generating entire media contents by combining or synthesizing the partial media contents and the background media contents in the web browser based on the region information. This will be described below in detail in FIG. 6.

The processor 110 may display entire media contents generated in step S2800 through the display unit 140 (S2900).

As illustrated in FIG. 4, when the managing server 200 provides only access information or generation information for the inserted media contents and the media contents themselves are received from an external entity separated from the managing server, the transmission load of the managing server may be reduced. Therefore, in the cloud environment in which one managing server communicates with multiple client terminals, a cloud service may be smoothly provided by reducing the transmission load of the managing server.

Figure 5:
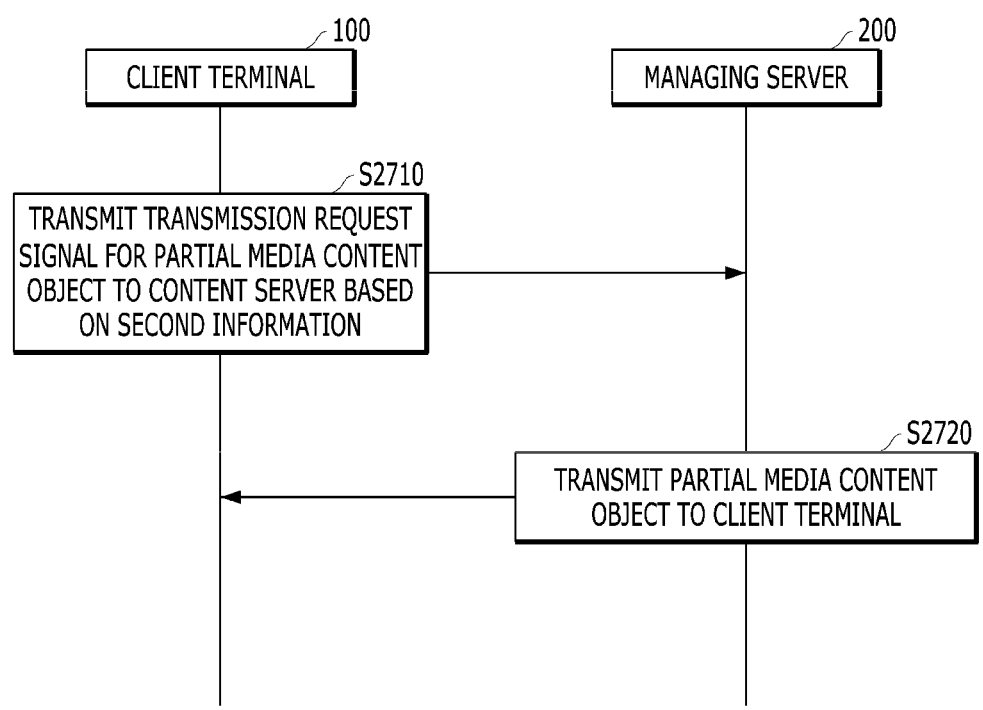
FIG. 5 is a signal flowchart showing an example in which a client terminal receives partial media content object from a content server.

FIG. 5 is a signal flowchart showing an example in which a client terminal receives partial media content object from a content server.

Referring to FIG. 5, the processor 110 of the client terminal 100 may transmit a transmission request signal for the partial media content object to the content server based on the second information (S2710).

As described above in FIGS. 3 and 4, the second information may include at least one of information on an address accessible to the partial media content object or information on a storage location of the partial media content object in the content server.

As described above in FIG. 3, when the content server 300, as a separate entity from the managing server 200, stores the partial media content object inserted by the client terminal 100 and receives a partial media content object transmission request, the content server 300 transmits the partial media content object to the client terminal.

Specifically, the content server 300 may be a server for storing and transmitting the image, the video, and the voice separately managed by a cloud service provider. Besides, the content server 300 may be a server (e.g., YouTube, Dropbox) operated by a third party other than the cloud service provider.

An example of sending the partial media content object transmission request signal transmitted by the client terminal 100 may include sending a download request for the partial media content object to the content server 300.

The content server 300 may receive the transmission request signal for the partial media content object through step S2710 and then transmit to the client terminal 100 the partial media content object corresponding to the second information (S2720).

The content server 300 which is a separate entity from the managing server 200 is provided to share the transmission load of the managing server 200 with the content server 300. Accordingly, a service quality through the managing server 200 may be enhanced in an environment in which the managing server 200 should communicate with multiple client terminals 100.

Figure 6:
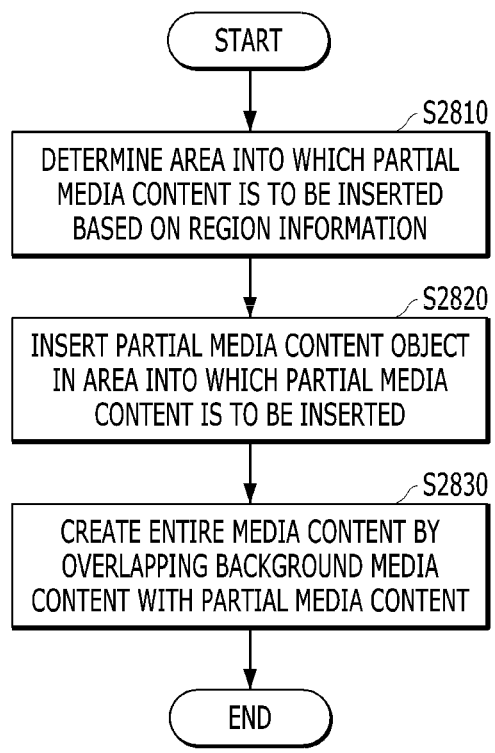
FIG. 6 is a flowchart showing an example of generating entire media contents on a web browser based on region information, partial media contents, and background media contents.

FIG. 6 is a flowchart showing an example of generating entire media contents on a web browser based on region information, partial media contents, and background media contents.

Referring to FIG. 6, the processor 110 of the client terminal 100 may determine an area into which the partial media contents are to be inserted based on the region information (S2810).

Here, the region information may be defined as information indicating an area in which the partial media contents are included in the background media contents as described above in FIG. 3. A detailed description of the region information is described above in FIG. 3, so the region information will be omitted herein.

Accordingly, the area into which the partial media contents are to be inserted may mean an inside of a zone expressed by the region information.

As an example, when the partial media contents are the image or the video, the area into which the partial media contents are to be inserted may be all pixels which belong to the pixel coordinate represented by the region information.

As another example, when the partial media contents are the voice and the background media contents are the voice, the area into which the partial media contents are to be inserted may be the inside of a voice section represented by the region information.

The processor 110 may determine the area into which the partial media contents are to be inserted in step S2810 and then insert the partial media content object into the determined area into which the partial media contents are to be inserted (S2820).

Here, inserting the partial media content object may mean expressing or reproducing the partial media contents generated based on the second information in the determined area into which the partial media contents are to be inserted.

The processor 110 may generate entire media contents by overlapping the partial media contents inserted in step S2820 with the background media contents (S2830).

Overlapping the background media contents with the partial media contents is just an example of a method for generating entire media contents based on the region information, the partial media contents, and the background media contents in the present disclosure and the method for generating entire media contents is not limited thereto.

As disclosed in FIG. 6, the client terminal 100 synthesizes a partial image and a background image to directly generate an entire image, thereby reducing a burden on the managing server which should synthesize and transmit the entire image. Accordingly, the load of media content streaming may be reduced in an environment in which the managing server should communicate with multiple client terminals.

Figure 7:
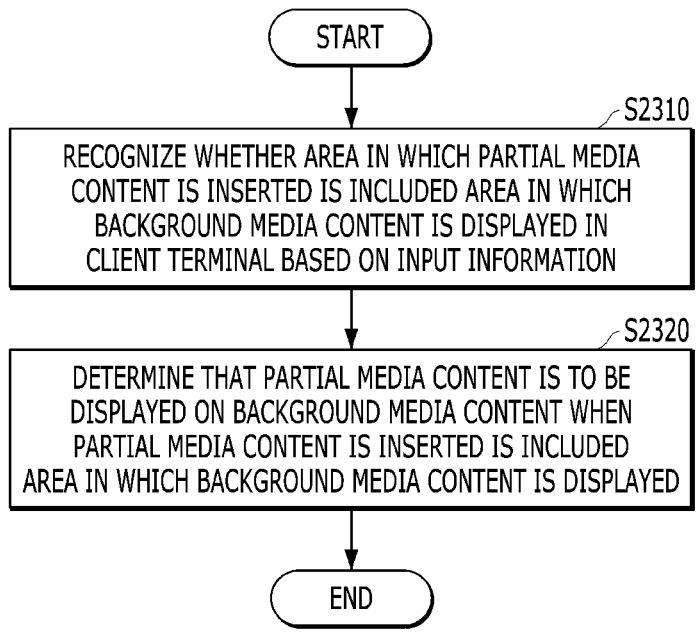
FIG. 7 is a flowchart showing an example in which a client terminal recognizes whether partial media contents are to be displayed on background media contents.

FIG. 7 is a flowchart showing an example in which a client terminal recognizes whether partial media contents are to be displayed on background media contents.

Referring to FIG. 7, the processor 210 of the managing server 200 may recognize whether the area into which the partial media contents are to be inserted is included in area in which the background media contents are displayed in the client terminal 100 based on the input information (S2310).

Specifically, the processor 210 may recognize the area in which the background media contents are displayed in the client terminal 100 and the area in which the partial media contents are included in the background media contents.

The processor 210 may determine that the partial media contents should be displayed on the background media contents when the area including the partial media contents is included in the area in which the background media contents are displayed (S2320).

Figure 8:
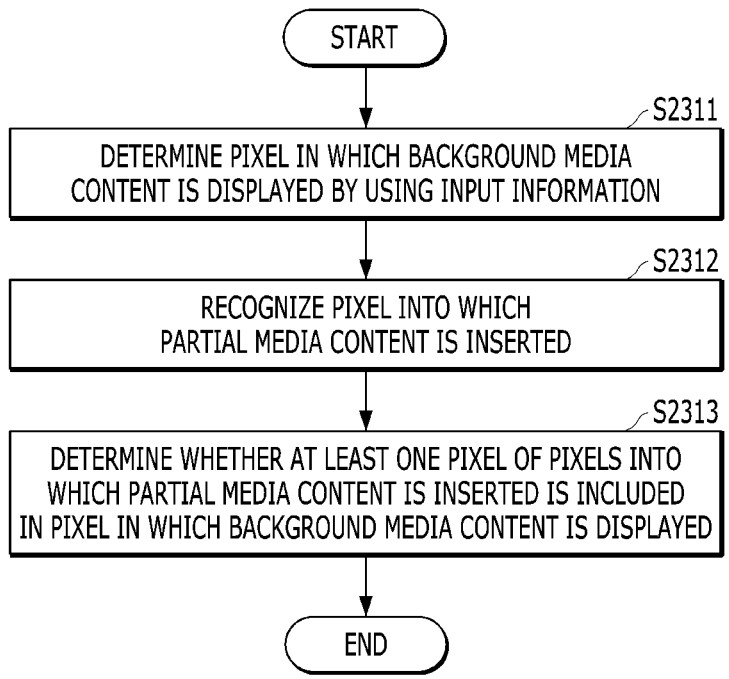
FIG. 8 is a flowchart showing an example in which a client terminal recognizes whether an area in which partial media contents are inserted is included in an area in which background media contents are displayed based on input information.

FIG. 8 is a flowchart showing an example in which a client terminal recognizes whether an area in which partial media contents are inserted is included in an area in which background media contents are displayed based on input information.

Referring to FIG. 8, the processor 210 of the managing server 200 may determine a pixel in which the background media contents are displayed by using the input information (S2311).

The processor 210 may determine a pixel in which the background media contents are displayed in step S2311 and then recognize a pixel into which the partial media contents are inserted (S2312).

The processor 210 may recognize the pixel into which the partial media contents are inserted in step S2312 and then determine whether at least one pixel among pixels into which the partial media contents are inserted is included in the pixel in which the background media contents are displayed (S2313).

As described above, it may be recognized whether the partial media contents are displayed through whether even one pixel included in the partial media contents corresponds to the display area of the background media contents. Only displayed partial media contents among the partial media contents are displayed to reduce the transmission load of the client terminal 100.

Figure 9:
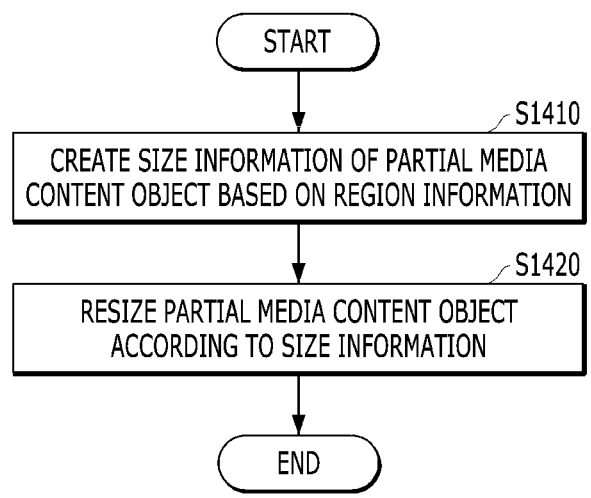
FIG. 9 is a flowchart showing an example of zipping a partial media content object based on region information.

FIG. 9 is a flowchart showing an example of zipping a partial media content object based on region information.

Referring to FIG. 9, the processor 210 of the managing server 200 may generate size information of the partial media content object based on the region information (S1410).

The processor 210 may resize the partial media content object according to the size information of the partial media content object generated in step S1410 (S1420).

Specifically, resizing the partial media content object may mean cutting the partial media content object according to the size of the size information generated by the region information.

In the process of uploading the partial media content object to the content server 300, the partial media contents are resized, thereby reducing the transmission load of upload of the partial media content object of the managing server 200. Further, the client terminal 100 may also reduce the transmission load of the client terminal 100 at the time of receiving the partial media content object from the content server 300 in order to generate entire media contents. Accordingly, an image synthesizing method according to the present disclosure may be effectively performed.

Figure 10:
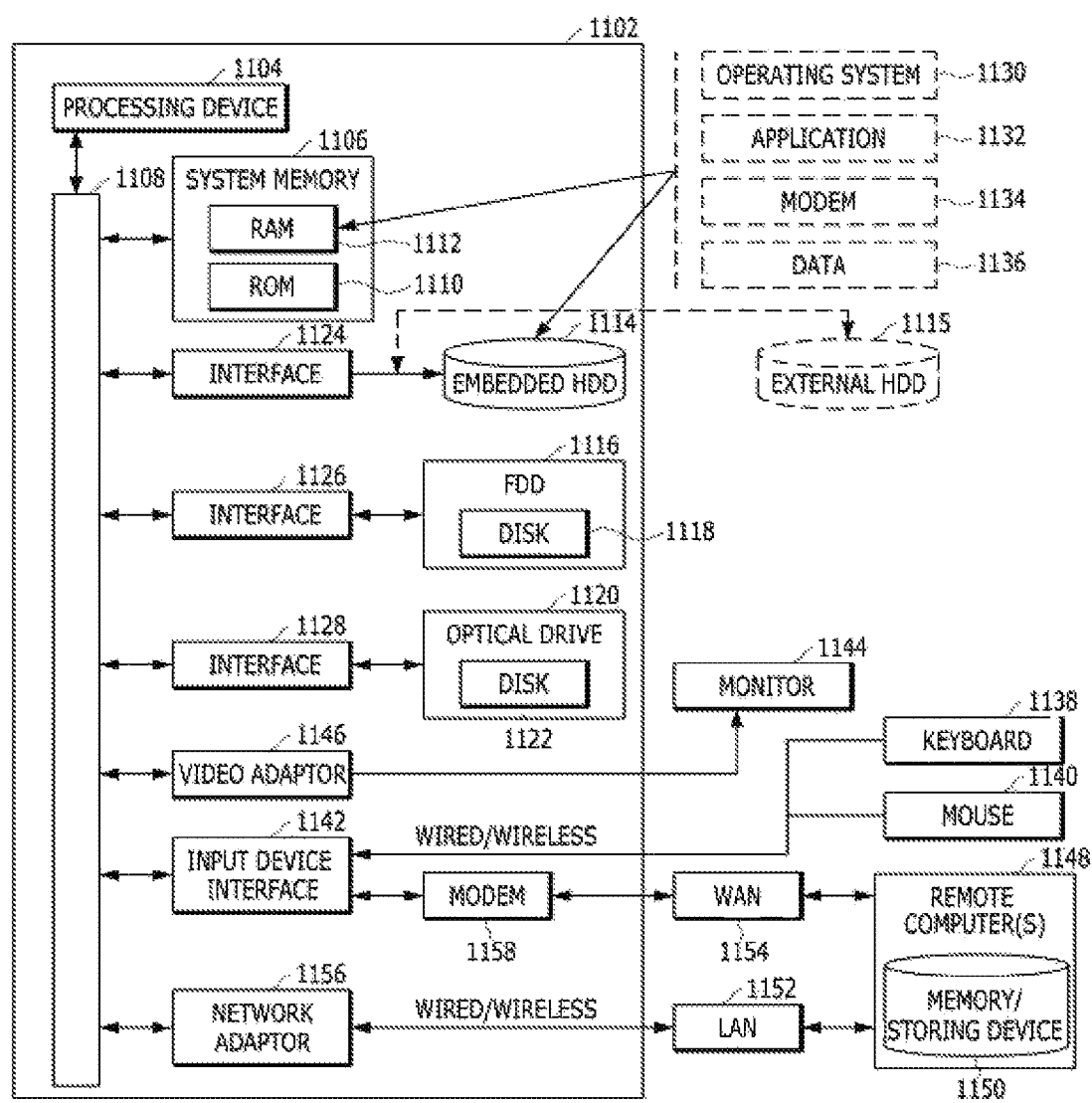
FIG. 10 is a simple and general schematic view for an exemplary computing environment in which some exemplary embodiments of the present disclosure may be implemented.

FIG. 10 is a simple and general schematic view for an exemplary computing environment in which some exemplary embodiments of the present disclosure may be implemented.

A computer 1102 illustrated in FIG. 10 may correspond to at least one of the client terminal 100, the managing server 200, the content server 300, and the communication network 400.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method for the present disclosure can be implemented by other computer system configurations including a personal computer, a handheld computing device, microprocessor-based or programmable home appliances, and others (the respective devices may operate in connection with one or more associated devicesas well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of anymedia among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch scene, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

The scope of the claims for the method in the claims of the present disclosure arises from the functions and features described in each step and is not affected by the order in which each step in the claims disclosed if a sequence relationship of the disclosure order in respective steps constituting the method is not specified. For example, in the claims set forth in the method including steps A and B, the scope of rights is not limited to the fact that step A precedes step B, even if step A is described before step B.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A method for processing media content in a client terminal comprising:
   receiving first information related to a partial media content and a background media content from a managing server, wherein the first information comprises region information of the partial media content and second information to create the partial media content;
   creating the partial media content based on the second information;
   creating an entire media content based on the region information, the partial media content and the background media content;
   displaying the entire media content;
   wherein the partial media content comprises one of a partial media content object and a function object; and
   wherein the background media content is obtained by converting a screen of a web office program executed by the managing server into an image of a type readable by the client terminal.

2. The method of claim 1, wherein the creating the partial media content based on the second information comprises:
   sending a transmission request signal for the partial media content object to a content server based on the second information; and
   receiving the partial media content object from the content server,
   wherein the second information comprises at least one of address information which enables an access to the partial media content object or location information which is related to a stored location of the partial media content in the content server.

3. The method of claim 1, wherein the creating an entire media content based on the region information, the partial media content and the background media content comprises:
creating the entire media content by composing or combining the partial media content and background media content based on the region information.

4. The method of claim 3, wherein the creating the entire media content by composing or combining the partial media content and background media content based on the region information comprises:
deciding an area for the partial media content to be inserted based on the region information;
inserting the partial media content object or the function object to the area for the partial media content to be inserted; and
creating the entire media content by overlapping the partial media content and the background media content.

5. The method of claim 1 further comprising:
creating the region information based on an inserting command to insert the partial media content object; and
transmitting the partial media content object and the region information.

6. The method of claim 1, wherein the creating the partial media content based on the second information comprises:
creating the function object corresponding to function decision information included in the second information.

7. The method of claim 6, wherein the creating the function object is conducted using web-based programming language.

8. The method of claim 1, further comprising:
creating the region information based on a generation command to create the function object; and
transmitting the region information to the managing server.

9. A method for a managing server connected to a client terminal to process a media content comprising:
receiving an input information related to a user command from the client terminal;
recognizing whether a partial media content is required to be displayed on a background media content in the client terminal based on the input information; and
transmitting first information required to create the partial media content and the background media content to the client terminal, when the partial media content is recognized as required to be displayed on the client terminal,
wherein the first information comprises region information and second information to create the partial media content,
wherein the partial media content includes one of a partial media content object and a function object, and
wherein the background media content is obtained by converting a screen of a web office program executed by the managing server into an image of a type readable by the client terminal.

10. The method of claim 9, wherein the recognizing whether a partial media content is required to be displayed on a background media content in the client terminal based on the input information comprises:
recognizing whether a first area that the partial media content is inserted into is included in a second area that the background media content is displayed in in the client terminal based on the input information; and
deciding the partial media content is required to be displayed on the background media content when the first area that the partial media content is inserted is included in the second area that the background media content is displayed in.

11. The method of claim 10, wherein the recognizing whether the first area that the partial media content is inserted into is included in the second area that the background media content is displayed in based on the input information comprises:
determining first pixels corresponding to the background media content to be displayed using the input information;
recognizing second pixels corresponding to the partial media content to be inserted; and
deciding whether at least one pixel of the second pixels corresponding to the partial media content to be inserted is included in the first pixels corresponding to the background media content to be displayed.

12. The method of claim 9 further comprising:
receiving the partial media content object and the region information from the client terminal; and
transmitting the partial media content object to the content server.

13. The method of claim 12, wherein the transmitting the partial media content object to the content server comprises:
zipping the partial media content object based on the region information.

14. The method of claim 13, wherein the zipping the partial media content object based on the region information comprises:
creating a size information of the partial media content object based on the region information; and
resizing the partial media content object based on the size information.

15. The method of claim 9, wherein the recognizing whether a partial media content is required to be displayed on a background media content in the client terminal based on the input information comprises:
deciding whether function object creation is requested based on the input information.

16. The method of claim 9, wherein one or more predetermined web office functions are assigned to the function object and the function object is able to have an interaction responding to the user input.

17. A client terminal to process a media content comprising:
a processor;
a storage module;
a network module; and
a display module;
wherein the processor is configured to:
receive first information related to a partial media content and a background media content from a managing server via the network module, wherein the first information comprises a region information of the partial media content and second information to create the partial media content,
create the partial media content based on a second information,
create an entire media content based on the region information, the partial media content and the background media content, and
control the display module to display the entire media content, wherein the partial media content comprises one of a partial media content object or a function object; and wherein the background media content is obtained by converting a screen of a web office program executed by the managing server into an image of a type readable by the client terminal.

18. A managing server to process a media content comprising:

a processor;

a storage module; and a network module;

wherein the processor is configured to:

receive an input information related to a user command from a client terminal, recognize whether a partial media content is required to be displayed on a background media content in the client terminal based on the input information, control the network module to transmit the first information required to create the partial media content and the background media content when the partial media content is recognized as required to be displayed on the client terminal, wherein the first information comprises a region information of the partial media content and second information to create the partial media content, wherein the partial media content comprises one of a partial media content object and a function object, and wherein the background media content is obtained by converting a screen of a web office program executed by the managing server into an image of a type readable by the client terminal.

19. A non-transitory computer readable medium storing a computer program to execute the method according to claim 1 in a computing device.

* * * * *